United States Patent [19]

Tommila et al.

[11] Patent Number: 5,322,152
[45] Date of Patent: Jun. 21, 1994

[54] METHOD AND APPARATUS FOR SORTING RETURNABLES

[75] Inventors: Eero Tommila, Heinola; Raimo O. Lehtola, Kouvola, both of Finland

[73] Assignee: Halton OY, Finland

[21] Appl. No.: 835,469

[22] PCT Filed: Jun. 18, 1991

[86] PCT No.: PCT/FI91/00190

§ 371 Date: Feb. 26, 1992

§ 102(e) Date: Feb. 26, 1992

[87] PCT Pub. No.: WO92/01272

PCT Pub. Date: Jan. 23, 1992

[30] Foreign Application Priority Data

Jul. 6, 1990 [FI] Finland .................................. 903419

[51] Int. Cl.[5] .................................................. G07F 7/06
[52] U.S. Cl. ............................................. 194/212; 198/372; 198/438; 209/525; 209/552
[58] Field of Search ............... 194/208, 209, 212, 213; 209/522, 523, 525, 552, 583, 592, 593, 917, 930; 198/372, 438

[56] References Cited

U.S. PATENT DOCUMENTS

| | | | |
|---|---|---|---|
| 3,327,850 | 6/1967 | Simmons | 209/111.7 |
| 3,549,890 | 12/1970 | Keller | 209/525 X |
| 3,955,179 | 5/1976 | Planke | 209/525 X |
| 3,955,678 | 5/1976 | Moyer | 209/583 X |
| 4,142,636 | 3/1979 | Planke | 209/524 |
| 4,214,663 | 7/1980 | Schopp et al. | 198/372 X |
| 4,285,426 | 8/1981 | Cahill | 194/209 |
| 4,369,873 | 1/1983 | Heuft | 198/372 X |
| 4,440,284 | 4/1984 | DeWoolfson | 194/212 X |
| 4,459,487 | 7/1984 | Leser | 209/525 X |
| 4,558,775 | 12/1985 | LaBarge et al. | 194/208 |
| 4,848,590 | 7/1989 | Kelly | 198/372 X |
| 4,986,407 | 1/1991 | Heuft | 198/438 X |

FOREIGN PATENT DOCUMENTS

| | | |
|---|---|---|
| 0029614 | 6/1981 | European Pat. Off. . |
| 3916423 | 11/1990 | Fed. Rep. of Germany ...... 209/522 |
| 2588401 | 4/1987 | France . |
| 384974 | 6/1973 | Sweden . |
| 604936 | 12/1977 | Switzerland . |

Primary Examiner—Michael S. Huppert
Assistant Examiner—Scott L. Lowe
Attorney, Agent, or Firm—Steinberg, Raskin & Davidson

[57] ABSTRACT

The invention relates to a method and equipment for identifying returned bottles, cans, plastic bottles or other packages (10) and for sorting them on the basis of an identification code, in which method a compensation corresponding to the package is given on the basis of the identification of the returnable package (10). The returnable package (10) is transferred to a measuring station of an identification device (2), at which measuring station is generated a signal corresponding to the shape of the returnable package (10) for the central unit (3) of the device, which compares the measured signal or signals with the preprogrammed signals stored in a memory (8) of the central unit (3) and identifying the shape of different packages. When the package shape corresponds to the shape stored in the memory (8) and programmed therein, a sorter (11) located after the measuring point is activated for transfer-ring the package (10) to its own storage storage station ($A_1$, $A_2$, $A_3$ . . . ) on the basis of the identification data.

15 Claims, 6 Drawing Sheets

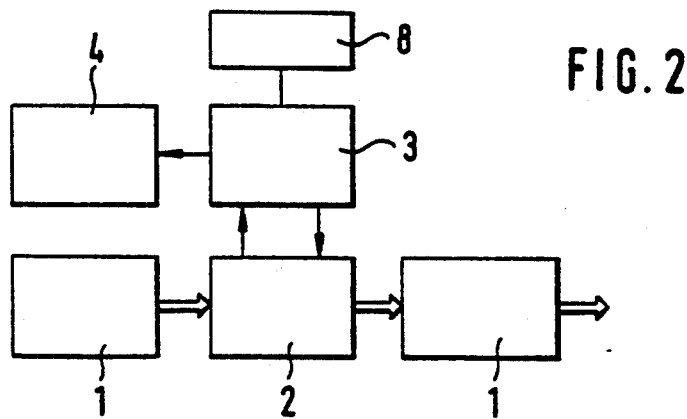
FIG. 2
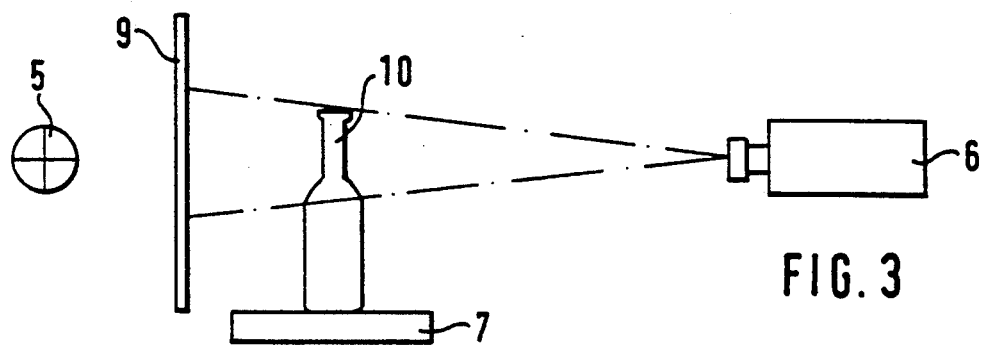
FIG. 3
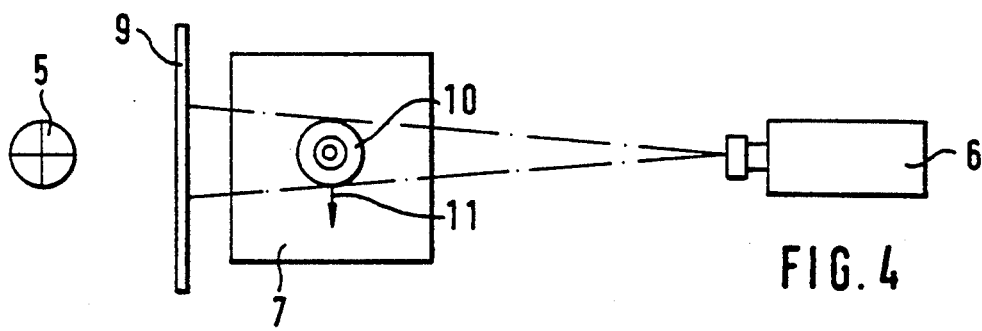
FIG. 4
FIG. 5
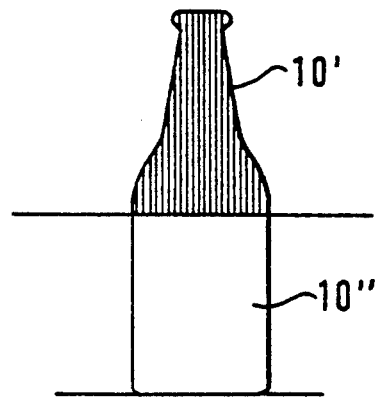

METHOD AND APPARATUS FOR SORTING RETURNABLES

BACKGROUND OF THE INVENTION

The invention relates to a method and a device for sorting returnables and the like.

Sorting solutions are known in prior art, in which a returnable bottle or the like is led from a belt conveyor via different gates to a storage station determined by a sorter. In solutions according to the prior art, the limited nature of the sorting can be regarded as a disadvantage. For example, the received packages may be only bottles or only cans or only plastic bottles. Different finishing devices and sorters are thus needed for different packages. This means that the investment costs are high when all types of returnables are to be collected at one location. The invention tries to find a solution to the above-mentioned problem. The applicants have discovered that equipment which is capable of sorting all types of returnable bottles, cans, plastic bottles and other packages would be desirable.

SUMMARY OF THE INVENTION

In the inventive method, the package is placed on a conveyor, which transfers the product to an identification system, which can be a conventional identifier operating according to a line camera principle and known e.g. of the applicant's earlier FI patent application 870904 corresponding to U.S. Pat. No. 4,885,461, issued Dec. 5, 1989.

According to the invention, different stations are provided along the conveyor extending from the identification device to which a specified product is transferred.

In accordance with the invention, it is advantageous to use air jets in the transferring process. However, when a heavy bottle travels along the conveyor, an air jet cannot transfer the bottle away from the conveyor by means of the air flow. Therefore, the bottle travels to the end of the passage and transfers to its own storage station via a transfer pipe located at this end. If returnables such as a can travel along the conveyor, it is transferred by the air jet away from the conveyor to a storage station located opposite the air jet.

In the first step, the identification device identifies the profile of the returnable. On the basis of this profile, the type of the returnable is determined by comparing the identified profile with those stored in the central unit of the identification device. If the profile is identified e.g. as a bottle, the bottle is transferred directly along the conveyor toward the end station.

If a returnable of a certain profile is identified, sorting occurs on the basis of this profile. After this identification process, a pusher, such as a solenoid, transfers the returnable away from the conveyor.

Similarly, an identification of the material of a returnable can be performed at the identification point. According to the invention, an inductive sensor can be used which can sense whether a can is one of steel or aluminum. The desired air nozzle is then activated, whereby the identified can may be transferred to its own storage station by the air nozzle. Each air nozzle corresponds to a respective sorting station. It is essential that the returnable is sorted at the identification device and that on the basis of the identification data, the appropriate air nozzle is activated.

According to the invention, the first storage station is a reject station. A returnable is transferred to the reject station when the profile and material of the returnable has been identified, compared with the profiles and materials stored in the memory register, and the weight or profile does not sufficiently correspond to a stored profile or weight. The first pusher then transfers the product from the conveyor to the reject station or returns it back to the starting point of the conveyor. A line code identification is used, if so desired, along with the shape identification, whereby the returnable concerned must also have the right line code in addition to the right shape.

The inventive method for identifying and sorting returnables is mainly characterized in that the returnable is transferred to an identification device where a signal corresponding to the profile and material of the returnable is sent to a central processing unit which compares the measured data with preprogrammed data stored in the central processing unit. The central processing unit identifies the profile and material of the different returnables, and when the profile and material of the package corresponds to the profile and material stored in the memory, a sorter located downstream from the measuring pint is activated in order to transfer the package to its respective station.

The inventive equipment for identifying and sorting returnables is characterized in that the equipment comprises a sorter and storage stations located down-stream from the identification device. In connection with each storage station, exists transferring means by which the returnable can be transferred to its respective storage station. The equipment comprises data transmission buses between each storage station and the central processing unit, whereby the profile of the returnable identified at the identification device is compared with the profile registered in the memory of the central processing unit. When the profile of the returnable corresponds to the profile registered in the memory, the air nozzle opposite the storage station related to the returnable package is activated on the basis of a signal produced by the central processing unit, by means of which returnable is transferred to the storage station.

BRIEF DESCRIPTION OF THE DRAWINGS

The invention is next described with reference to certain preferred embodiments of the invention shown in the figures of the accompanying drawings, to which the invention is not intended solely to be limited.

FIG. 2 shows a principal block diagram of the construction and operation of the inventive package receiving device.

FIG. 3 shows principally and seen from the side the construction of the package identification device related to the package receiving device of FIG. 2.

FIG. 4 shows the equipment of FIG. 3 seen from the top.

FIG. 5 shows the formation of a line photograph of the package to be monitored with the identification device of FIGS. 3 and 4.

DESCRIPTION OF THE PREFERRED EMBODIMENT

Figure 1A:
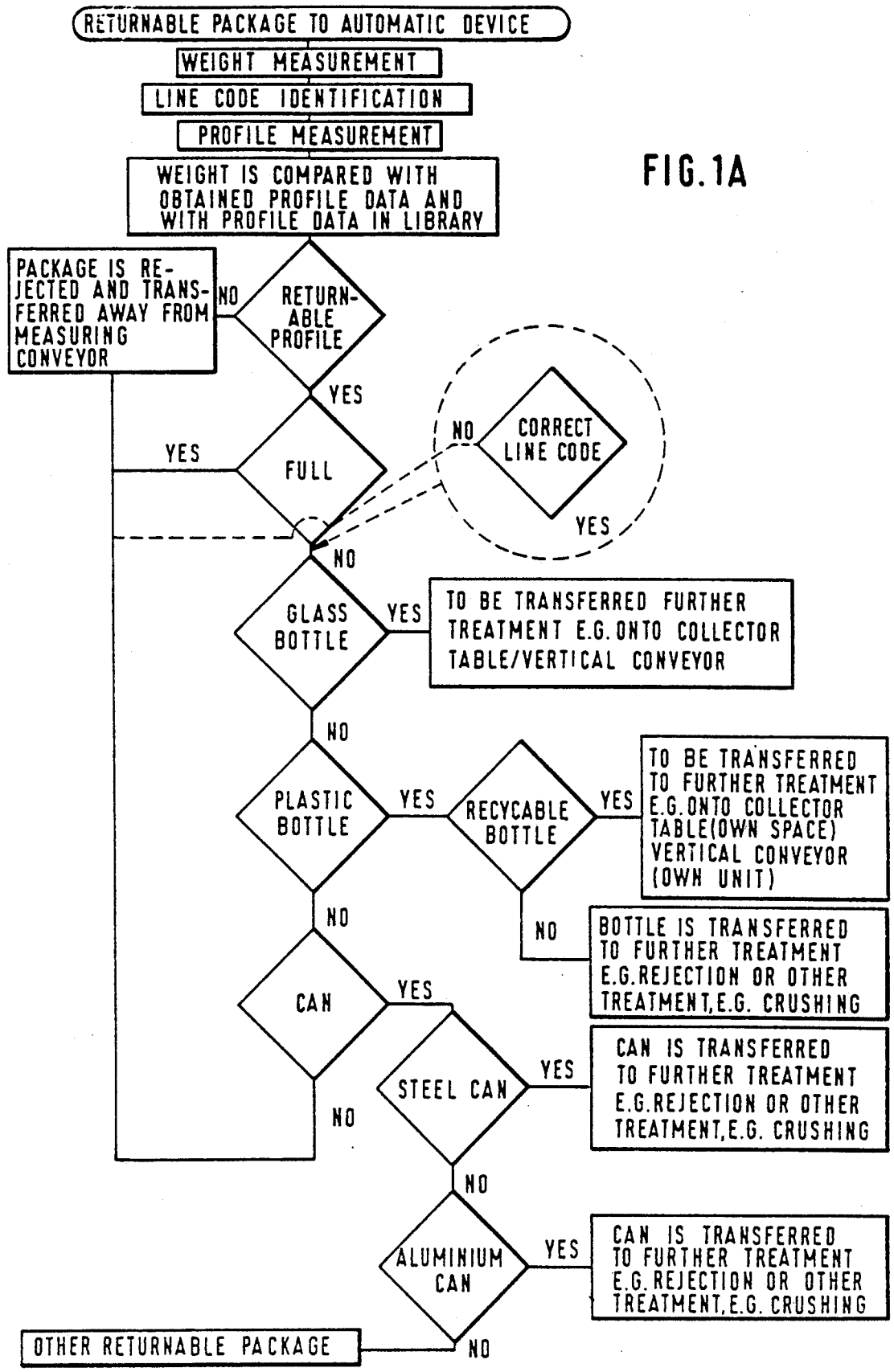
FIG. 1A shows schematically as a block diagram representation the inventive method for handling the returned packages.

FIG. 1A shows the inventive method and equipment schematically as a block diagram representation. The equipment can separate several different returnables from each other. The line-code number is shown in FIG. 1A in an area defined by a dashed line.

The sorting device is flexibly connected to the automatic bottle returning device, whereby said automatic device forms a returning center, which is capable of separating and sorting all current returnable and recyclable packages.

A returnable 10 is placed on a conveyor 1, whereby an automatic device is activated. The conveyor 1 transfers the package at a constant speed downstream.

The identification of the returnable 10 occurs so that the weight of the package 10 is first measured, after which the profile shape is identified. A microprocessor compares the obtained data with a library in its memory which also contains the correct weight measured for each acceptable profile.

In one embodiment of the invention, a line code reader is provided which operates along with the profile measurement by separating returnables having the same profile but e.g. a different return value, supplied by a different manufacturer or by a different bottler than each other.

If a returnable is not found in the memory register, it is rejected and transferred away from the conveyor e.g. by means of a solenoid.

If the returnable is found in the memory register, but it is too heavy, it is rejected as being full by a solenoid.

If the returnable is found in the memory register but the line code reader rejects it, the returnable is removed from the conveyor by means of a solenoid.

If the returnable's profile and weight have been matched in the memory register and it has been identified e.g. as a glass bottle, it travels along the conveyor either onto a collector table or along a vertical conveyor onto a collector table located at a lower level, or to other further treatment.

In the following cases, the package has been identified as returnable:

The returnable is a recyclable PET bottle and it is transferred away from the measuring conveyor by means of an air flow or a solenoid.

The returnable is a disposable plastic bottle and it is transferred away from the measuring conveyor by means of the air flow.

The returnable is a can and the material of the can is identified by an inductive sensor as being made of steel. It is therefore blown away from the conveyor, at a different point than an aluminum can.

It is another returnable and, it is blown away from the conveyor by means of the air flow.

Measuring the weight of the returnable occurs as follows: under the conveyor is mounted a strain-gauge transducer, by means of which the weight of the returnable can be measured with accuracy. The weight measurement is achieved through the use of a self calibration system.

The line code identification is performed by utilizing a line code reader (readers).

The profile identification of the returnable occurs by means of a line camera/light source system.

The returnable travels along the conveyor through a measuring station, on one side of which is arranged a line camera and on the other side of which is located a line light source. When the returnable arrives at the measuring station, its edges prevent the entry of light into the camera. It then stores the shape of the returnable in the memory and compares the profile with an acceptable profile prestored in the machine memory.

After the returnable has been identified and found to have a shape not stored in the memory, too high a weight, or an incorrect line code, it is rejected and a reject solenoid is activated. The returnable travels along the conveyor at a constant speed which determines the location of the returnable and correctly times the movement of the solenoid.

If the returnable has been identified, a solenoid is activated which is designed for the transfer of these packages. Alternatively, an air flow for transferring the bottle from the conveyor can be used. The location data is obtained as above.

Disposable plastic bottles can be transferred from the conveyor most easily by using an air flow. A correctly timed blowing can be realized as above. When the processor has identified the bottle as a disposable plastic bottle, a photocell is activated with a certain delay which activates the blowing when the bottle reaches the location of the photocell.

When the processor has identified the package as a can, both photocells of the blower assigned to the can are activated with a certain delay. Whether the can is made of steel or aluminum is determined by an inductive sensor, causing a deactivation of one photocell according to the material data.

If the package is some other returnable, the operation occurs as with the disposable plastic bottles.

The necessary air pressure is achieved e.g. directly from a pneumatic network. The pressure of the network must then be reduced suitably by means of a pressure reducing valve.

The air pressure needed can also be produced e.g. by a radial or axial blower.

The air is divided into different channels. Each channel has its own closing valve which can be controlled separately.

After the sorting process, the returnables can be e.g. crushed to conserve space. Each product must therefore have its own crushing unit.

All returnable packages can be transferred directly from the conveyor to collector tables on a lower level via vertical conveyors. The disposable packages travel directly into a reject container reserved for each disposable package and after being crushed, they move correspondingly into their own reject container.

After the sorting, the returnables can be moved horizontally as well.

Figure 1B:
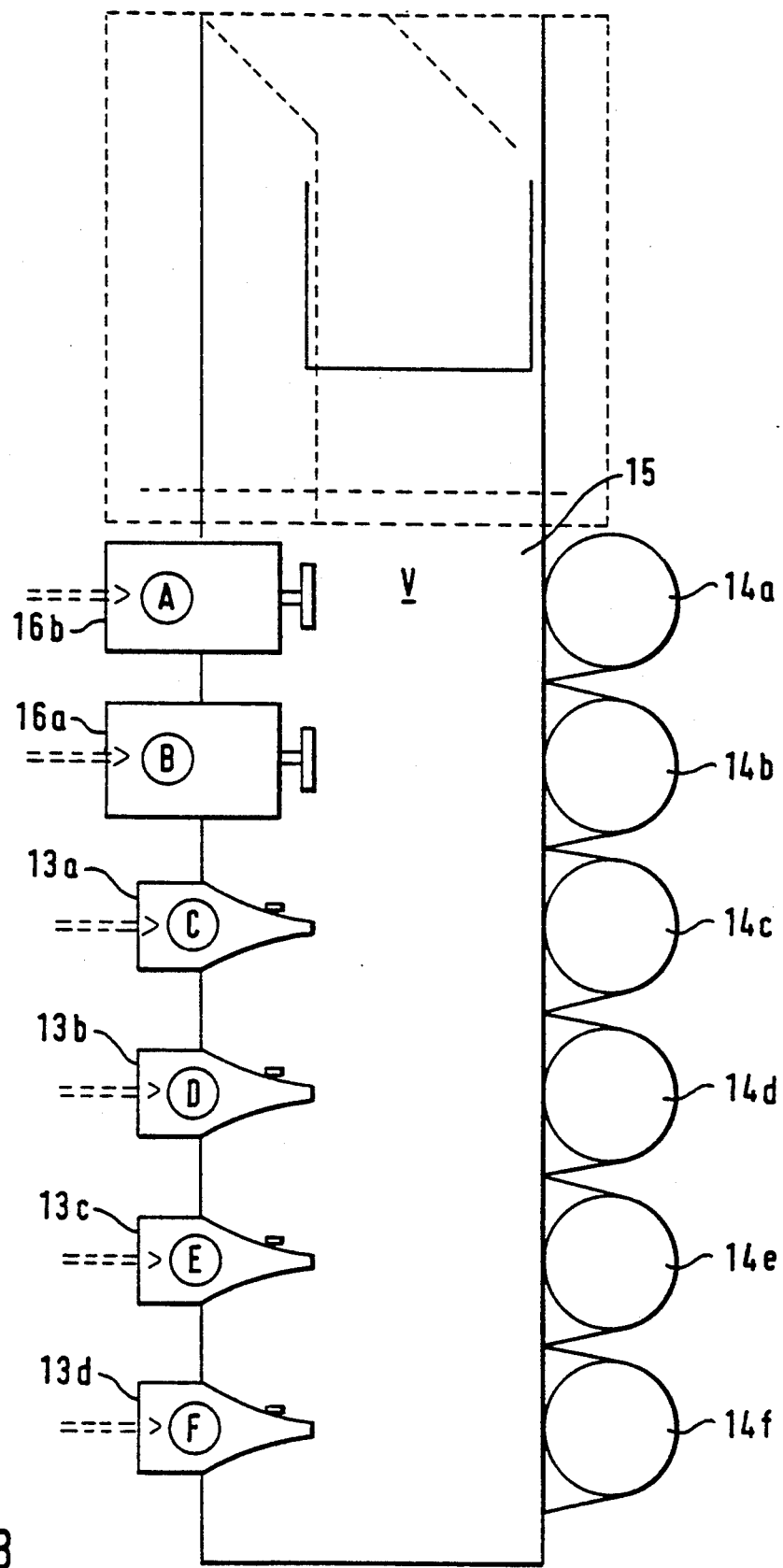
FIG. 1B shows an equipment solution related to the method of FIG. 1A, which is one of its preferred embodiments.

FIG. 1B shows an embodiment of the inventive device. According to the figure, the equipment first comprises weight measuring means, e.g. a strain-gauge transducer (see 18 in FIG. 6). The conveyor transfers a returnable from the weight measuring point to a profile measuring device (see FIGS. 3 and 4). The profile measuring device identifies the profile of the returnable and also compares the profile-shape related weight data of the empty can or package with the measured weight data. If the measured weight data corresponds to the weight data stored in the register, the bottle is transferred to its respective storage station by either a solenoid 16a or 16b or one of the air nozzles 13a, 13b, 13c and 13d. The activation occurs as the returnable passes a solenoid or one of the nozzles. On the opposite side of the conveyor is located a return pipe 14a, 14b ... 14f, whereby the returnable can be transferred via a pipe from an upper storage space $E_1$ to a lower storage space $E_2$.

An inventive application shown by way of example in FIG. 2 contains a receiving device for bottles, cans and other such packages, which comprises a transfer equipment 1 for transferring returnable packages 10, and identification device 2 with its data processing unit 3 for identifying and accepting packages having certain shapes, as well as a registering device 4 for registering accepted packages. The transfer equipment 1 can be comprised e.g. of one or several belt conveyors, a rotatable tray conveyor or in general, any conveyor suitable for transferring packages. The conveyor can be arranged to transfer packages horizontally and/or vertically, although a horizontal transfer is preferred in connection with the inventive bottle receiving device. The transfer equipment can further comprise a feeder for feeding the packages to the transfer device and a rejector for removing the packages from the top of the transfer device onto the floor of the storage space into a bottle rack, etc.

The identification device 2 comprises a data processing unit 3 with a memory unit 8 and registering unit 4. The data processing unit 3 is thus provided with a data file containing the acceptable package shapes, i.e. data about acceptable package shapes can be entered into the file for comparing the information obtained about the shape of the package to be monitored with the information corresponding to the accepted package shapes. The registering device registers the quantity of the acceptable returnable, their sizes, and/or the amount of money to be compensated or returned.

FIGS. 3 and 4 show as a principal schematic view of an identification device 2, which mainly comprises a stationary illuminator 5 for illuminating the package 10, a detector 6 for inspecting the package and a conveyor 7 for transferring the package past the detector. The detector is arranged to monitor the package momentarily, at line-like points as the bottle is transported by the conveyor 7, past the detector such that the line-like inspection points provide information. The bottle is at least about the shape of the neck and upper part of the package, i.e. the detector is arranged to take a so called line photograph of the bottle.

When taking the line photograph, the detector 6 thus periodically takes line photographs of the package in accordance with FIG. 5, as the conveyor 7 transfers the package past the detector. Line photographs can be taken periodically, i.e. the line density of the photograph can be adjusted as desired according to the accuracy of the information desired. The detector 6 changes the obtained line photograph information into electrical impulses to be transmitted to the data processing unit in a known manner according to FIG. 1.

In connection with the identification of the bottles, it is not necessary to take a line photograph of the entire bottle. It is generally sufficient to photograph the upper part 10' of the bottle according to FIG. 5 since the characteristic features of the bottle types and models generally appear best at the upper part of the bottle. The lower part 10" of the bottle is thus suitably not photographed.

In FIGS. 3 and 4, the detector 6 is a conventional line camera, which is arranged to photograph the bottle at the upper section of its neck while the body moves past the camera laterally perpendicular to the direction of the objective of the camera with vertical line photographs at intervals of 1 mm. The identification device is programmed to measure the height of the bottle. If so desired, the detector 6 can be arranged to take horizontal photographs of the bottle, whereby the conveyor 7 is suitably arranged to move the bottle vertically in order to photograph the bottle at the desired height.

When a line camera is used as the detector 6, certain advantages are obtained, relative e.g. to a laser-based identification device. First of all, the purchase price of a line camera is lower than that of a laser. A line camera does not require nearly as much service as do laser devices. A line camera is reliable in terms of operation and construction and withstands vibrations and other external mechanical stresses. A line camera can consist e.g. of a CCD camera (Charge Coupled Diode) or of a photodiode camera (Self Scanning Array). Furthermore, a line camera can be readily connected to a data processing unit in which an electrical line of signals is suitable to be used. In addition, a line camera can be adjusted to intervals of taking photographs and timed according to the desired scanning frequency.

Figure 6:
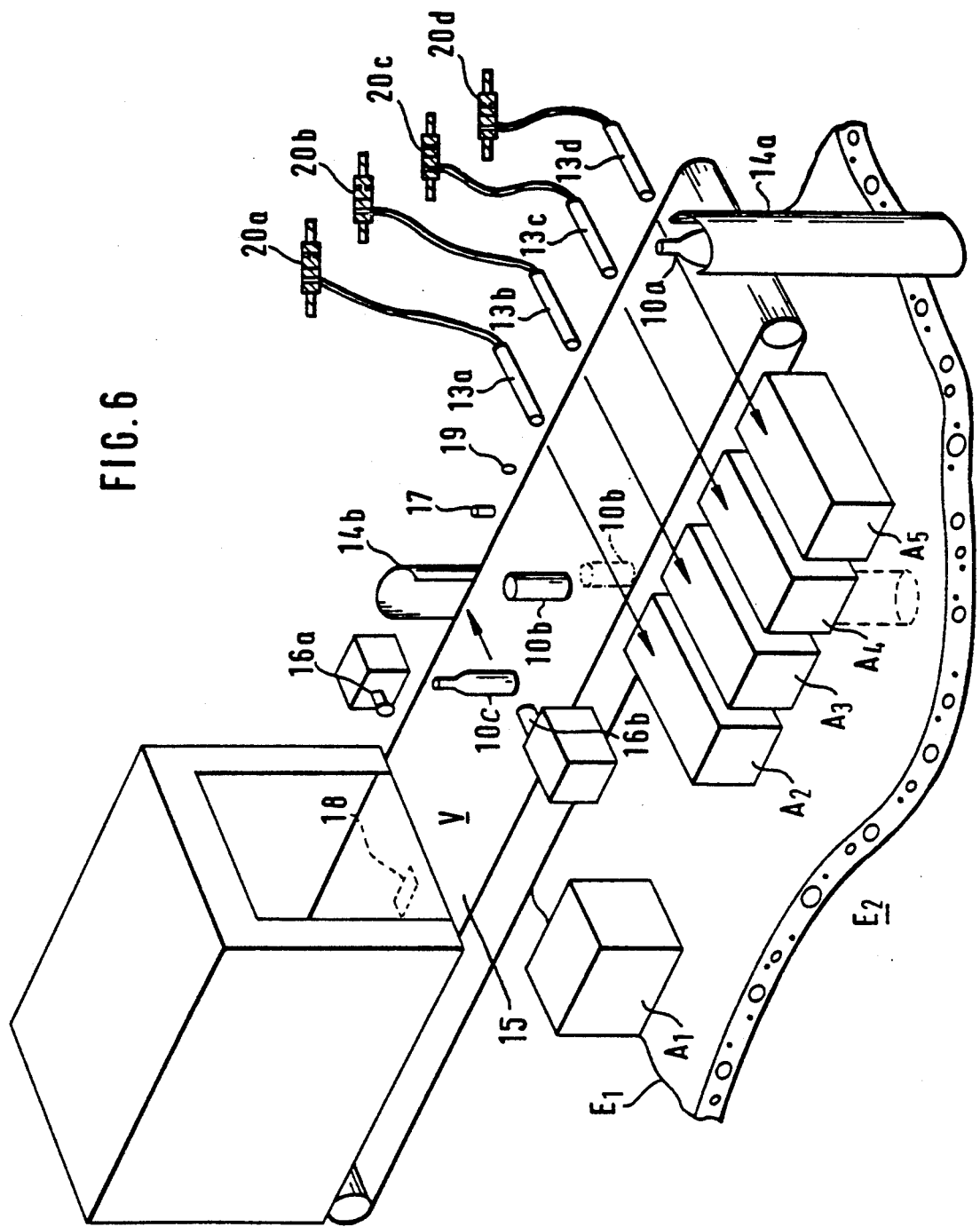
FIG. 6 shows as an axonometric view the inventive equipment and method and embodiment, in which at least part of the returnable packages are transferred from the storage station to a lower storage station.

FIG. 6 shows axonometrically the inventive equipment and method. The returned bottle, can, milk can or other package 10 is brought to the measuring point of the identification device and the profile of the package 10 to be returned is identified. The identified profile is compared with the profiles stored in the memory 8 of the central processing unit 3. If the shape/profile is identified, the sorter 11 located after the measuring point is activated on the basis of the measurement for a sorting procedure, whereby the measured package 10 is removed from the conveyor passage to the desired storage station $A_1$ or $A_2$ or $A_3$ ... on the basis of the measurement.

Accordingly, the inventive device measures the product and compares it with the shapes stored in the memory 8 of the central processing unit, whereby a receipt is given to the person returning the package on the basis of the identified dimensions. The inventive device can thus process any returned products, since in addition to the different shapes of bottles, the different shapes and types of cans, plastic packages, etc. have been stored in the memory 8 of the central processing unit 3.

According to FIG. 6, the returned package 10a travels from the measuring point past a continuously operating air nozzle 13a, 13b ... towards a discharge pipe 14a at the end of the conveyor, from which the bottle transfers from the upper position $E_1$ through gravitation to a lower storage station $E_2$. In contrast, the returnable can 10b shown in FIG. 6 moves laterally across the conveyor 15 by means of an air blow caused by the nozzle 13a.

In the embodiment of the figure, the nozzle 13a and/or, 13b and/or 13c and/or 13d can be continuously in operation. In the embodiment of FIG. 6, the second blowing nozzle 13b is located downstream from nozzle 13a, and is activated when e.g. the can 10b is returned, which has been identified on the basis of the shape, weight, line code and material at the measuring point at the initial end of the conveyor.

According to FIG. 6, the station adjacent to the measuring point comprises a pusher 16a, by means of which a non-acceptable package is pushed to the reject conveyor or directly to reject station $A_1$.

According to FIG. 6, bottles 10c are removed from the main conveyor 15 by the pusher 16b located upstream from the blowing nozzle. Accordingly, bottles of a certain size and/or type are transferred on the basis of the measurement data to the return pipe 14a by the pusher 16b. A bottle 10c is transferred to a lower floor $E_2$. The largest bottles are transferred to the pipe 14a at the end of the conveyor. The sorting can thus be performed e.g. only on the basis of a certain bottle size. In another possible embodiment of the invention, bottles that are smaller than a certain bottle diameter or length are transferred via the first pusher to the first return pipe 14b thus to the lower storage station $E_1$. All other bottles are transferred to the return pipe 14a at the end of the conveyor 15 and thus to the lower storage station $E_1$.

Figure 7:
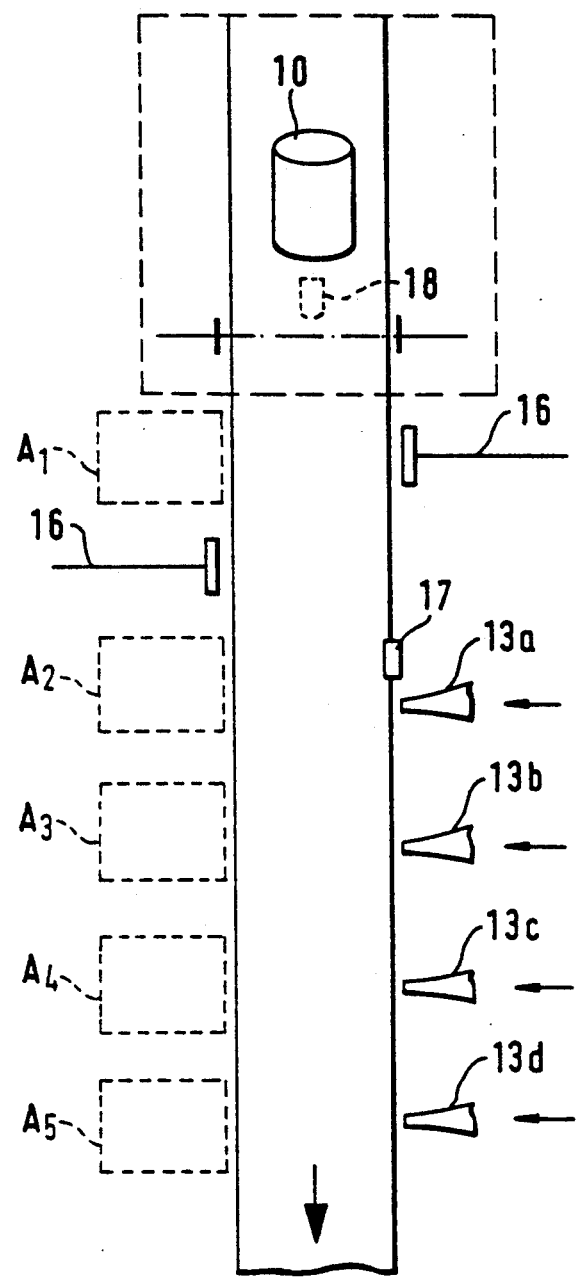
FIG. 7 shows schematically the operation of the equipment of FIG. 6.

FIG. 7 shows schematically the operation of the inventive device on the basis of one of its embodiments. The can 10 is brought to the measuring point, and if the can is e.g. a steel can, an inductive sensor 17 identifies the can and activates the first air nozzle 13a, whereby the can falls into its own storage station $A_2$. For example, the shape of the can and the line code, when needed, have been identified in the measuring pint. In the next step, if the inductive sensor 17 does not identify the can as a steel can, but it is e.g. an aluminum can, the second nozzle 13b is immediately activated and the first nozzle 13a is not activated. In this way, steel cans can be sorted from aluminum cans, and the steel can may be transferred to its storage station $A_3$.

Plastic bottles can be identified at the measuring pints on the basis of the shape and, when needed, the line code of the bottles. After the identification, the third air nozzle 13c is activated, whereby the air nozzle blows the returnable bottle to its own storage station $A_4$ at the nozzle 13c. Furthermore, milk cans may be identified on the basis of their shape, and when needed, the line code, when they have first been measured at the measuring point of the device. After the identification, the last air nozzle 13d is activated and the returnable can is transferred from the conveyor to its own storage station $A_5$.

In connection with the plastic bottles, the plastic bottles that are used for recycling can be returned separately to their own storage station. A separate storage station can thus be located upstream from the nozzles for recycling, to which station a returnable bottle or other package can be pushed by a pusher related to the station or by e.g. an air nozzle.

An ejector 16a upstream from all above-mentioned sorting points can be located on the conveyor for rejected packages. When e.g. a returnable can has been identified on the basis of its shape, the weight of the can is next identified by a strain-gauge transducer 18, which is located below the conveyor belt of the conveyor 15. If the can weight does not correspond to the weight of an empty can stored in the memory register of the central processing unit, the ejector located in the vicinity of the measuring point is immediately activated.

Figure 8:
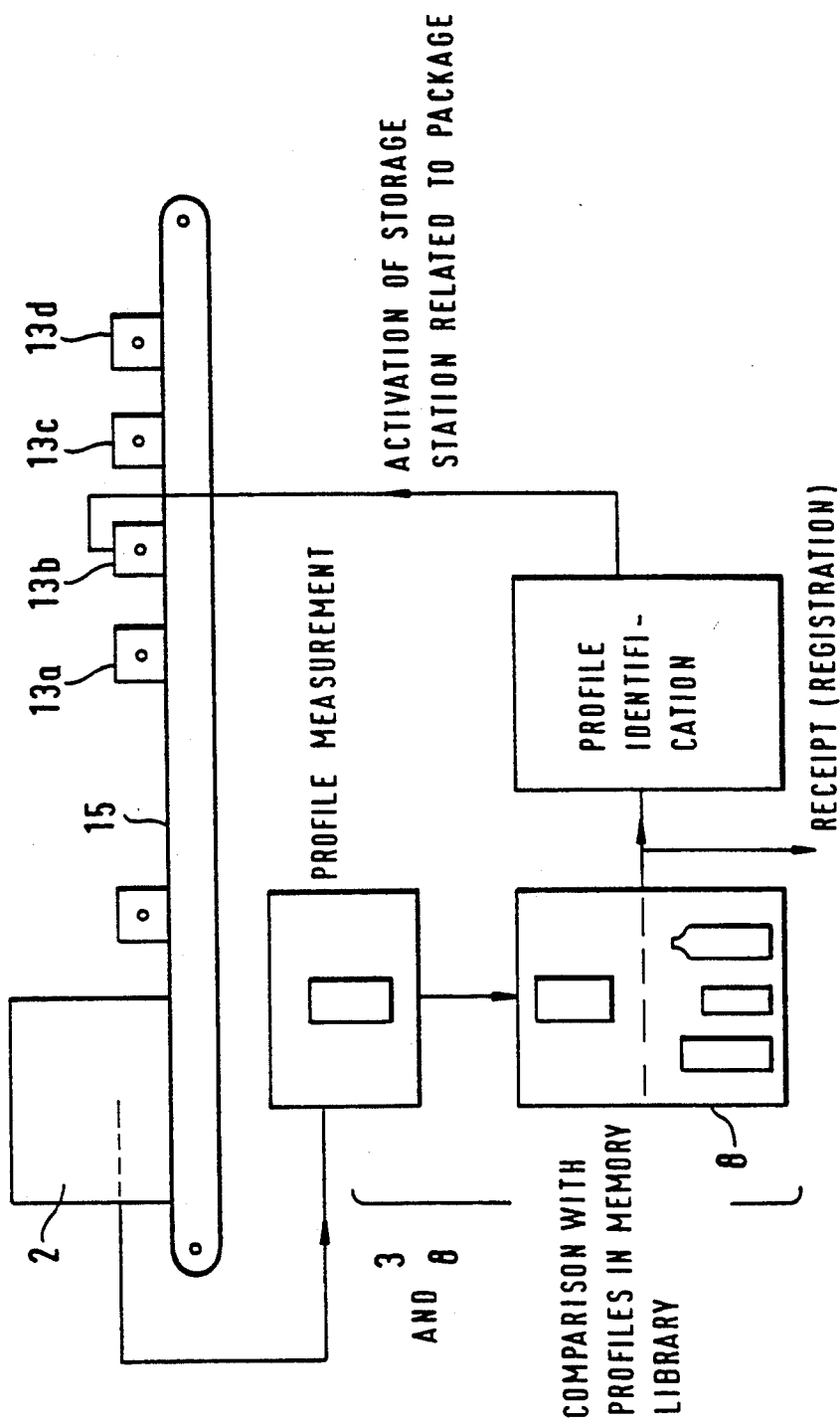
FIG. 8 shows as a block diagram representation the operation of the equipment of FIG. 6 and 7.

FIG. 8 shows as a block diagram representation the operation of the inventive device. According to the figure, the shape of the product is identified in the measuring point e.g. in a manner described in the applicant's earlier patent application FI 87094 corresponding to U.S. Pat. No. 4,885,461, issued Dec. 5, 1989, and said shape is compared with the known shapes stored in the central processing unit. If the shape is found to match one stored in the memory register, the weight is compared with the weight of an empty package stored in the memory 8 of the central register. If the weight corresponds to the weight stored in the memory within a certain tolerance range, the returnable package 10 is accepted and transferred downstream from the measuring station 15 by the conveyor. The central processing unit transmits the information to the sorter 11 corresponding to the shape of the identified package, whereby, as the package enters at the sorter, a sensor, e.g. a photocell 19 and/or an inductive sensor 17, identifies the entry of the package, and e.g. the air nozzle is switched to the blowing state e.g. when a valve device 20a, 20b ... shown in FIG. 6 switches into the open position. The conveyor passage V thus comprises along its length different storage stations $A_1$, $A_2$, ... The first station on the conveyor passage can comprise a reject station for full packages and the second station can be a reject station for otherwise non-identified and thereby rejectable packages.

In accordance with the invention, all kinds of packages can be identified and sorted by means of said method and device. The sorting may concern bottles, cans, milk containers, and other packages of a corresponding material. The registering device 4 (in FIG. 2) gives the returning person a compensation for the package e.g. in the form of a receipt, money, or the like.

What is claimed is:

1. An apparatus for sorting returnables into respective storage stations based on characteristics of said returnables, said apparatus comprising:
   conveying means for transporting said returnables in a downstream direction;
   an identification device, said identification device including:
   a measuring station, said measuring station including;
     means for identifying at least one characteristic of a returnable of said returnables; and
     means for identifying material data of said returnable; a central processing unit, said central processing unit including;
       a memory register containing characteristics and material data corresponding to the characteristics and material data of said returnables;
   means for comparing said at least one characteristic and material data of said returnable to characteristics and material data stored in said memory register;
   sorting means, said sorting means including;
   data transmission buses coupling said sorting means to said central processing unit; and storage stations situated downstream of said identification device; and
   transfer means for transferring said returnable to a selected one of said storage stations on the basis of a signal generated by said central processing unit and transmitted to said sorting means corresponding to the identified said at least one characteristic and material data of each respective returnable;
   whereby each returnable is deemed acceptable if the identified characteristics and material data of said returnable corresponds to certain characteristics and material data stored in said central processing unit.

2. Apparatus as claimed in claim 1 wherein said conveying means for transporting said returnables is a single conveyor belt.

3. Apparatus as claimed in claim 1 wherein said sorter means comprises at least one blowing nozzle producing an air jet, whereby a returnable is transferred to its appropriate station by means of said air jet produced by said at least one blowing nozzle.

4. Apparatus as claimed in claim 3 wherein said at least one blowing nozzle is fitted on one edge of a conveyor and that one of said storage stations corresponding to said at least one blowing nozzle is located on an opposite side of said conveyor from said at least one blowing nozzle.

5. Apparatus as claimed in claim 3 wherein said at least one blowing nozzle comprises valve means for opening and closing said at least one blowing nozzle, and wherein said central processing unit includes means for generating a signal for controlling the position of said valve means determined by said characteristics and material data identified by said identifying means.

6. Apparatus as claimed in claim 1 further including at least one substantially vertical extending first pipe having an upper end adjacent to said conveyor means and a lower end adjacent to a first lower one of said storage stations, whereby some of said returnables are transferred through said first pipe from said conveying means to said first lower storage station.

7. Apparatus as claimed in claim 6 including a second substantially vertical pipe, said first pipe comprising means for guiding returnables from a downstream end of said conveying means to said first lower storage station and said second pipe comprising means for guiding returnables from a side of said conveyor to a second lower storage space.

8. Apparatus as claimed in claim 1 where said transfer means include a pusher fitted on a side of said conveying means opposite to a rejection chute and immediately downstream from said identification means whereby said returnables whose both said at least one characteristic and material data do not correspond to said characteristic and material data stored in said memory register are transferred to a lower storage space through said rejection chute.

9. Apparatus as claimed in claim 1 further including recording means for recording a compensation value for each said returnable.

10. Apparatus as claimed in claim 1 wherein said means for identifying said profile of said returnable is a line camera/light source system.

11. Apparatus as claimed in claim 1 wherein said means for identifying the material of said returnable is an inductive sensor.

12. Apparatus as claimed in claim 1 wherein said at least one characteristic includes the profile of the returnable.

13. Apparatus as claimed in claim 1 wherein said at least one characteristic includes the type of the returnable.

14. Apparatus as claimed in claim 1 wherein said at least one characteristic includes both the profile and the type of the returnable.

15. An apparatus for sorting returnables into respective storage stations based on characteristics of said returnables, said apparatus comprising:
   conveying means for transporting said returnables in a downstream direction;
   an identification device, said identification device including;
   a measuring station, said measuring station including;
     means for identifying the profile of a returnable of said returnables; and
     a central processing unit, said central processing unit including;
       a memory register containing profile data corresponding to profile characteristics of said returnables;
       means for comparing identified profile data of said returnable to profile data stored in said memory register;
   sorting means, said sorting means including;
     data transmission buses coupling said sorting means to said central processing unit; and
     storage stations situated downstream of said identification device;
   transfer means for transferring said returnables to a selected one of said storage stations on the basis of a signal generated by said central processing unit and transmitted to said sorting means corresponding to identified profile characteristics of each respective returnable; and
   at least two vertical pipes situated in connection with said conveying means, whereby some of said returnables are transferred from a most downstream point on said conveying means to one of said pipes to a first lower storage station and whereby other of said returnables are transferred from the side of said conveying means via the other of said pipes to a second lower storage station.

* * * * *